United States Patent

Livingston

[15] 3,694,549

[45] Sept. 26, 1972

[54] NEUTRALIZATION OF THE SYSTEMIC TOXIC PRINCIPLE IN OAK BY FEEDING IRON COMPOUNDS

[72] Inventor: William H. Livingston, Rte. 1, Box 274, Artesia, N. Mex. 88210

[22] Filed: March 16, 1970

[21] Appl. No.: 20,074

[52] U.S. Cl. .................................. 424/147, 424/295
[51] Int. Cl. ............................................. A61k 27/00
[58] Field of Search ............................. 424/147, 295

[56] References Cited

OTHER PUBLICATIONS

Milks, Practical Vet. Pharm. Materia Med. & Therap., 1949, page 513.
Eseltine, Chem. Abst. Vol. 29 (1935) page 55164.
Stevens, Chem. Abst. Vol. 39 (1945) page 23286.
Ohashi, Chem. Abst. Vol. 53 (1959) page 22995c.
Tomov et al., Chem. Abst. Vol. 62 (1965) page 990(b).
Dollahite et al., Chem. Abst. Vol. 59 (1963) page 10679f.
U.S. Dispensatory, 24th Ed. (1947) page 1182.
Begovic et al., Vet. Bull Vol. 28 (1958) page 266.

*Primary Examiner*—Sam Rosen

[57] ABSTRACT

This invention relates to the prevention of systemic oak poisoning in cattle by the dietary administration of iron.

1 Claim, No Drawings

NEUTRALIZATION OF THE SYSTEMIC TOXIC PRINCIPLE IN OAK BY FEEDING IRON COMPOUNDS

This discovery relates to the fact that there are large areas of the United States and the world in which the oak plants produce toxic amounts of leaves, buds, and acorns which are sufficient to cause poisoning of cattle. This usually occurs in the spring. The toxin in the leaves, buds, and acorns, when ingested in large quantities, causes sickness or death in the cattle. The estimated damage to the cattle industry in Texas alone is $10,000,000.00 annually as a result of this oak poisoning. This figure includes death loss, loss of pasture use during the toxic period, and costs of extra feed that must be fed to the cattle during the oak-poison season.

The value of the following improvement is that this loss can be prevented by feeding at least 200 to 500 mg of palatable non-toxic iron to each animal each day. Edible salts such as ferric ammonium citrate, reduced iron, ferrous carbonate, ferrous sulfate, iron saccharides, and any other iron compound that is not toxic and will deliver at least 150 mg elemental iron can be added to the ration and still be palatable.

The exact amount of iron will vary according to the palatability and to the need. I have used iron to control the toxicity of shin oak. In one trial there were 2,000 head of cattle left on the shin oak during the toxic season. One bull died of bloat, but this was not related to oak poisoning. The control herd consisted of 200 cows and calves that were not supplemented with iron. Forty of these control animals died, showing typical signs of oak poisoning. The symptoms of the cattle that died were: emaciation, no temperature, hard stools, with terminal bloody diarrhea, and depression. Autopsy of the animals revealed gastroenteritis, with degeneration of the epithelial lining, patechial hemorrhages; the BUN was elevated consistantly. The method of development of a compound for neutralizing the toxin follows:

1. The buds were ground up and soaked in water.
2. Countless compounds were checked against this solution.

I discovered that a metal stirring rod reacted with the solution forming a black precipitate. The rod I found to contain primarily iron.

3. In order to check the effectiveness of an iron compound, 4 hereford calves, all weighing between 380 and 400 pounds were selected. Group one, the control group, consisting of one steer and one heifer, weighed 796 pounds. Group two, the group fed the toxin neutralizer, weighed 790 pounds. The two groups were separated, placed on a ration of ground milo, alfalfa hay, and one-half pound of a 32 percent protein molasses supplement. The two groups gained weight at the same rate (one-half pound per day) for 2 weeks. The feed was limited so that the groups had finished eating in 1 hour. After 14 days, it was determined that the calves were not going to have shipping fever so the test was started. Both groups were than fed 15 pounds of shin oak in their daily ration.

In Group two each calf was fed 150 mg of elemental iron in the form of ferric ammonium citrate and ferrous sulfate, in the molasses supplement. Group two began to gain weight at the rate of 1 ½ pounds per day and continued to do so until the end of the test. Their combined weights increased to 890 pounds, an increase of 100 pounds for the 30 day test or 50 pounds per calf.

Group one, the control group, also gained weight at the rate of 1 ½ pounds per day, but on the 5th day, they began to eat less and started showing the usual signs of oak poisoning. The steer died on the 25th day: the heifer, at the end of the 30 day test period, had lost 52 pounds, from 387 pounds to 335 pounds. The heifer stayed at this weight for 4 months before slowly gaining 100 pounds at which time she was disposed of.

I therefore, particularly point out and distinctly claim as my improvement:

1. A method for the neutralization of the toxic principle of oak comprising administering to cattle grazing on oak pastures during the toxic season a palatable, non-toxic iron compound which will deliver a detoxifying amount of iron.

* * * * *